Patented Dec. 19, 1950

2,534,485

UNITED STATES PATENT OFFICE 2,534,485

PHOTOCHEMICAL PRODUCTION OF
BENZENE HEXACHLORIDE

Warren L. Towle, Akron, Ohio, assignor to Pittsburgh Plate Glass Company, Allegheny County, Pa., a corporation of Pennsylvania No Drawing. Application July 27, 1948,
Serial No. 40,999

2 Claims. (Cl. 204—163)

This invention relates to the addition chlorination of benzene to form benzene hexachloride, 1, 2, 3, 4, 5, 6 hexachlorocyclohexane, and particularly to an improved method for achieving this addition chlorination by means of actinic light.

It is known that chlorine may be reacted with benzene in the absence of a substitution chlorination catalyst such as aluminum chloride or ferric chloride, under such conditions that chlorine adds to the double bonds of the benzene ring and forms the chlorinated product benzene hexachloride by addition of six chlorine atoms. In the past, this process has been conducted in several ways. In U. S. Letters Patent No. 2,010,841, granted to Harry Bender, August 13, 1935, a process has been described wherein benzene is added to liquid chlorine to produce benzene hexachloride. In U. S. Letters Patent No. 2,218,148, granted to Thomas Hardie, October 15, 1940, chlorine gas is led into a body of benzene in the absence of a substitution catalyst. Both of the above processes and the majority of the other processes which have been described in the literature or which have been proposed, require activation of the addition reaction by light in the form of actinic light such as is found in sunlight or ultra-violet light if optimum results are to be obtained. Actinic light may be defined as light, the wave length of which is from 2500 to 4500 angstrom units, or at least above the visible range in frequency. It may also be defined as light which produces chemical change.

In all of the known methods involving the production of benzene hexachloride by the reaction of chlorine and benzene in the presence of actinic light, the light rays are directed upon a mixture of chlorine and benzene.

As a general proposition, in the laboratory preparation of benzene hexachloride, which is customarily carried out in glass equipment, no particular difficulties are encountered because of the small scale of the operation. Benzene hexachloride is a white crystalline solid which precipitates from the chlorine-benzene reaction mixture as it is formed in excess of its limited solubility. A light source such as a mercury arc lamp generally is placed at a point outside but relatively close to the glass reaction vessel in such a position that the precipitating benzene hexachloride will not directly obstruct the light rays emitted by the lamp. However, in large scale production of benzene hexachloride which is usually conducted in a metal reactor, an enclosed lamp is placed inside the reaction vessel. When this is done certain problems immediately arise because of the tendency of the solid benzene hexachloride to collect upon the surface of the lamp.

Obviously, as the deposition of benzene hexachloride upon the lamp increases, the intensity of radiation decreases accordingly until no radiation whatever may be available to catalyze the reaction. In the absence of the physical catalyst, the reaction does not progress and it becomes necessary to remove the light source in order to free it from the objectionable deposit on its surface. Since several of the preferred processes of making benzene hexachloride are carried out at the boiling point of liquid chlorine which is about minus 34° C., and since the equipment for the reaction must be gas-tight thereby necessitating sealing of the openings with a multiplicity of special closing devices, when it becomes necessary to stop the reaction and remove the lamp, a considerable amount of refrigerating energy and valuable time are lost.

According to this invention, I have found these difficulties may be largely circumvented by subjecting the chlorine to actinic radiation at a point which is spaced from the reaction mixture of benzene and chlorine, and before the chlorine is mixed with the benzene. Following this irradiation and before the activating effect of the radiation has decayed, the chlorine is mixed with the benzene and the desired reaction occurs. In other words, while the chlorine is out of contact with benzene it is irradiated, and before the effect of irradiation has completely decayed the chlorine is reacted with benzene to form benzene hexachloride.

The process affords a convenient method of effecting a reaction of chlorine with benzene to produce benzene hexachloride in the dark. However, it may also be used in conjunction with processes which utilize some irradiation of the reaction mixture.

It should be understood that this novel process contemplates the use of a light which is of sufficient intensity and in such a position with relation to the reaction equipment that a substantial activation of the chlorine is effected at a point where the chlorine is not in contact with benzene. In other words, it is not intended to embrace those situations wherein the light is directed at the reaction mixture in such a manner that an incidental portion of the total output of light causes activation of the chlorine while it is out of contact with the benzene. Generally speaking, it is intended that at least 25 to 50 percent or even more of the chlorine activation shall occur through the irradiation of chlorine at a point where the chlorine is essentially out of contact with benzene.

It is essential that the irradiated chlorine be contacted with benzene before a complete decay in the irradiation effect has occurred. While it is not possible to establish a definite time limitation since the process is adaptable to so many types of equipment, as a general proposition the reactants should be brought together preferably within 1 and in any case within 60 seconds after the chlorine has been irradiated, or even within a fraction of a second in some instances, to secure the maximum effect of this external irradiation process. If the reactants are contacted 4 to 5 minutes after the chlorine is irradiated, decay of the irradiation effect is so far advanced that the process is rarely considered useful.

In certain processes for producing benzene hexachloride, liquid benzene and liquid chlorine are reacted and refluxed at the temperature of liquid chlorine in the presence of a suitable chemical or physical catalyst. By adapting my method to this process the previously irradiated chlorine is reacted with the benzene and benzene hexachloride is precipitated from the reaction mixture. Since an excess of chlorine is usually present in this process, it may be flashed off in gaseous form from the reaction vessel and recirculated for further irradiation while out of contact with the benzene. I do not confine my irradiation process to treating liquid chlorine since it is equally well adapted to the treatment of chlorine in gaseous form.

The chlorine may be subjected to irradiation with actinic light either without the confines of the reaction vessel in which the benzene and chlorine are reacted to produce benzene hexachloride, or it may be irradiated inside the reaction vessel at a point which is out of contact with the chlorine-benzene reaction mixture itself. This may be particularly advantageous where a large reactor is employed and it is desired to transfer the irradiated chlorine to the benzene with a minimum of time loss. It may also be considered desirable to install one or more sources of actinic light in the reactor so that all of the equipment will be housed in one unit.

The effectiveness of my novel irradiation process will be better understood by reference to the following example:

*Example*

A three-necked flask was equipped with a thermometer well, a separatory funnel which served as a reservoir for chlorine and benzene, and a jacketed glass irradiating tube surmounted by a dry ice cooled reflux condenser. Two 15 watt tubular fluorescent lamps were placed in a vertical position parallel to the irradiating tube and ¼ inch from its outer shell, so that essentially the entire length of the tube including the drip-tip at its lower end could be exposed to actinic radiation. The three-necked flask and the reservoir were made light-tight by a covering of aluminum foil over which was wrapped asbestos tape.

Chlorine was added slowly to the flask in an amount 100 percent in excess of the theoretical amount needed to react with 0.5 gram mol of benzene which was subsequently added to the flask through the reservoir. The light was turned on and the reaction mixture was permitted to reflux for two hours. It was observed that chlorine dripped from the drip-tip back to the flask at a rate of about two drops per second.

When this reaction was completed, a completely wrapped water-cooled reflux condenser was substituted for the equipment above the reactor flask. 100 grams of benzene were added to the flask via the reservoir and the flask was heated to 85° C. for 30 minutes after which the system was maintained at 22 centimeters of mercury below atmospheric pressure for 15 minutes. After this treatment the odor of chlorine was no longer noticeable.

The irradiating tube and original reflux condenser were washed with benzene. The reaction product and the benzene washings were thoroughly mixed together and subsequently were analyzed for benzene hexachloride.

A blank run was performed using the original irradiating tube and reflux condenser, but with a side-arm connection between them through which the condensed chlorine could be withdrawn to a receiving flask and thus prevented from returning to the reaction flask. In the blank run, similar amounts of chlorine and benzene were used and the process was carried out just as was the first run except that the vaporized chlorine was distilled over and collected in the receiving flask and fresh chlorine was added from the darkened reservoir to maintain a constant level of chlorine in the reaction flask. After the two hour run was completed, 100 grams of benzene was added to the reactor, the wrapped water cooled condenser was substituted, and the excess chlorine removed as in the first run. In this case the benzene used to wash the upper equipment was collected separately.

Upon analysis of the contents of the reactor flask in the first run, it was found that 20.6 grams of chlorine had reacted with benzene to form benzene hexachloride. Analysis of the contents of the reactor flask in the blank run indicated that 2.7 grams of chlorine had reacted therein to form benzene hexachloride indicating that a degree of reaction was obtained. Analysis of the washings from the irradiating tube and reflux condenser, showed that 2.4 grams of chlorine had reacted with benzene to form benzene hexachloride in the irradiating tube, the condenser and the receiving flask. Thus, subtracting the total of 5.1 grams of reacted chlorine obtained in the blank run from the total of 20.6 grams reacted in the test run, it was found that 15.5 grams of chlorine had reacted with benzene in the reaction flask in the test run. For 0.5 gram mol of benzene, 106.5 grams of chlorine are theoretically required to completely convert the benzene to benzene hexachloride. Consequently, 14.5 percent of theoretical reaction occurred due to the irradiation of chlorine which was combined with benzene while outside the light zone.

While I generally prefer to subject chlorine to irradiation by actinic light out of contact with benzene and thereafter react the chlorine and benzene to form benzene hexachloride in the absence of a chemical addition catalyst, the process may be readily combined with chemical catalysis. For example, in a copending application for U. S. Letters Patent, Ser. No. 15 487, filed March 17, 1948, by William E. Bissinger and Franklin Strain, the use of certain peroxy dicarbonate esters to induce addition chlorination of benzene is disclosed. This reaction is conducted by mixing chlorine and benzene in the liquid phase in the presence of the selected ester. I may subject the chlorine to irradiation by actinic light while the chlorine is out of contact with the benzene and then may conduct the irradiated chlorine to the benzene where the formation of benzene hexachloride will be initiated both by the irradiation of the chlorine and by the peroxy dicarbonate ester. In certain cases, it may be desirable to start the reaction with molecular chlorine which has not been subjected to irradiation and initially catalyze the formation of benzene hexachloride with the peroxy dicarbonate ester. Excess chlorine from time to time may then be flashed from the reaction mixture, irradiated with actinic light and returned to the benzene where the peroxydicarbonate ester may no longer be present in sufficient quantities to catalyze the formation of benzene hexachloride. Such a variation will tend to eliminate stopping the reaction process at various intervals to add additional peroxy dicarbonate ester and will permit the reaction of chlorine and benzene to proceed with constantly re-activated chlorine.

The invention may be utilized in conjunction with other processes. It is well known that at least five isomeric forms of benzene hexachloride are produced by the several addition chlorination processes and it is believed that of these forms the gamma isomer is largely responsible for the toxicity of benzene hexachloride when the compound is employed as an insecticide. Unless special methods are resorted to, the gamma isomer content of benzene hexachloride will fluctuate widely over a range of from less than 7 per cent to as high as 12 to 16 per cent by weight of benzene hexachloride produced. In one such method disclosed in application for Letters Patent, Serial No. 29,927, filed May 28, 1948, by Alphonse Pechukas and Frederick E. Kung, the undue variation in gamma isomer content may be substantially avoided by conducting the reaction of chlorine with benzene in the presence of an inert or non-reactive solvent for chlorine and benzene, said solvent being a compound in which the gamma isomer of benzene hexachloride has a solubility which is extremely low, that is, on the order of 1 gram or less per 100 grams of solvent. The fluorochloromethanes are especially suitable for practicing this method. The reaction of benzene and chlorine in this particular process is usually conducted in the presence of actinic light so my novel irradiation process may be easily adapted to it.

Chlorine may be subjected to irradiation by actinic light while the chlorine is out of contact with benzene both in processes which employ an excess of chlorine and those in which benzene predominates. In certain instances, for example, it is desirable to produce benzene hexachloride having a high gamma isomer content by reacting a substantial excess of chlorine with benzene while maintaining a portion of unreacted benzene present throughout the major portion of the reaction cycle. This is accomplished by maintaining an amount of benzene which is in excess of the amount of activated chlorine and requires careful correlation of the intensity of actinic light with the unreacted benzene. When my chlorine irradiation method is used either in lieu of directly irradiating the chlorine as it is in contact with the benzene, or in conjunction with a controlled direct irradiation of the chlorine-benzene mixture by means of a light of low intensity, unusually satisfactory results may be obtained. By using my chlorine irradiation method, a very accurate control over the amount of activated chlorine entering the reaction mixture is provided and there is little possibility of substitution chlorination of the gamma isomer of benzene hexachloride due to the formation of excessive atomic chlorine. Since the success of this method for producing benzene hexachloride having a high gamma isomer content is so dependent upon extremely careful control of the irradiation with actinic light, my novel chlorine irradiation method is of great value because of the simplicity of control and the reproducibility of results obtainable. By irradiating chlorine itself while out of contact with the benzene-chlorine reaction mixture and particularly by conducting the process at a distance from the reaction vessel itself, it will be seen that should the rate of formation of atomic chlorine become too great at any particular time, the flow of chlorine to the reaction mixture can be immediately stopped or the irradiated chlorine can be retained until there has been a sufficient decay of the irradiation effect to permit introduction into the reaction mixture. As another variation, the intensity of the actinic light may be reduced considerably or the light may be completely turned off and the flow of chlorine reduced substantially should the amount of atomic chlorine in the reaction vessel become excessive.

Although I prefer to employ my novel irradiation process in conjunction with the methods for manufacturing benzene hexachloride which have been herein set forth in some detail, I do not intend to limit the scope of the invention to these methods alone. My novel method may be employed in any process for manufacturing benzene hexachloride which involves the use of actinic light as a catalyst.

Although the present invention has been described with respect to the specific details of certain embodiments, these shall not be regarded as limiting the scope of the invention except insofar as included in the accompanying claims.

I claim:

1. A process of producing benzene hexachloride by reacting chlorine with benzene, which comprises subjecting the chlorine to actinic radiation while the chlorine is in a zone spaced from the zone in which the benzene is disposed, and mixing the irradiated chlorine with benzene within one second after irradiation and maintaining the resulting mixture outside the zone of influence of actinic irradiation.

2. A process of producing benzene hexachloride by reacting liquid chlorine with benzene, which comprises subjecting the liquid chlorine to actinic radiation while the chlorine is in a zone spaced from the zone in which the benzene is disposed, and mixing the irradiated liquid chlorine with benzene within one second after irradiation and maintaining the resulting mixture outside the zone of influence of actinic irradiation.

WARREN L. TOWLE.

REFERENCES CITED

The following references are of record in the file of this patent:

UNITED STATES PATENTS

| Number | Name | Date |
|---|---|---|
| 2,010,841 | Bender | Aug. 13, 1935 |
| 2,218,148 | Hardie | Oct. 15, 1940 |
| 2,438,900 | Cooke et al. | Apr. 6, 1948 |

FOREIGN PATENTS

| Number | Country | Date |
|---|---|---|
| 504,569 | Great Britain | Apr. 26, 1939 |

OTHER REFERENCES

Ellis et al., Chemical Action of Ultraviolet Rays, 1941, pp. 284, 287 and 540.